United States Patent [19]

Daley

[11] 4,252,293

[45] Feb. 24, 1981

[54] HYDRAULIC MOLD RELEASE MECHANISM FOR PRECAST CONCRETE PRODUCTS

[75] Inventor: James H. Daley, Norwalk, Ohio

[73] Assignee: Norwalk Concrete Industries, Inc., Norwalk, Ohio

[21] Appl. No.: 89,990

[22] Filed: Oct. 31, 1979

[51] Int. Cl.[2] .......................... B28D 7/10; B29C 7/00

[52] U.S. Cl. .......................... 249/74; 249/136; 249/68; 425/443; 425/DIG. 5

[58] Field of Search .......................... 249/66 C, 66 R, 74, 249/136, 67, 68; 425/DIG. 5, 441, 443, 444

[56] References Cited

U.S. PATENT DOCUMENTS

| | | | |
|---|---|---|---|
| 770,677 | 9/1904 | Cuatt | 249/102 X |
| 854,843 | 5/1907 | Rempis | 249/144 |
| 1,593,792 | 7/1926 | Caldwell | 249/63 X |
| 1,636,102 | 7/1927 | Miller | 425/443 X |
| 2,169,885 | 8/1939 | Jung | 249/68 X |
| 2,227,966 | 1/1941 | Emsley | 249/68 |
| 2,304,899 | 12/1942 | Dupre | 249/67 X |
| 3,134,142 | 5/1964 | Canner | 249/68 |
| 3,539,146 | 11/1970 | Smith | 425/442 X |
| 3,718,415 | 2/1973 | DeFelice | 249/68 X |
| 3,807,682 | 4/1974 | Catinella et al. | 249/68 |
| 3,832,118 | 8/1974 | Leonard et al. | 249/74 X |
| 4,184,835 | 1/1980 | Talbot | 425/DIG. 5 X |

*Primary Examiner*—J. Howard Flint, Jr.

*Attorney, Agent, or Firm*—Diller, Ramik & Wight

[57] ABSTRACT

This disclosure relates to a hydraulically operated mechanism which releases precast concrete products, such as precast septic tanks, burial vaults, steps, and like precast concrete products from the mold in which they are cast, the mold including a base, an inner mold core and an outer surrounding mold shell, and the release mechanism being carried by the base and including at least one movable portion which defines a part of the mold cavity, a rod secured to the mold cavity portion, cam means for imparting motion to the rod which in turn moves the mold cavity portion whereby a precast product is moved and thus released from the associated mold cavity, and means for rotating the cam means to impart the motion to the rod with the latter being preferably, though not necessarily, hydraulically actuated.

12 Claims, 5 Drawing Figures

HYDRAULIC MOLD RELEASE MECHANISM FOR PRECAST CONCRETE PRODUCTS

A primary object of the present invention is to provide a quick and easy method of breaking the bond between precast concrete castings or molded articles and the associated molding or forming equipment in which such articles are formed. Essentially, the invention is directed to a hydraulically actuatable release mechanism which itself is part of a mold in which articles such as septic tanks, burial vaults, steps, pipes and other precast concrete products are cast or molded.

The release mechanism is associated with a mold base which in turn is associated with an inner mold core and a surrounding mold outer shell with the latter components defining a mold cavity in which the article is precast or molded.

The release mechanism of the invention is in part defined by and essentially carried by the mold base and includes four movable portions which at least in part define the cavity in which the article is to be precast, and these portions are movable simultaneously to impart a "breaking" force to the cast articles thereby releasing the same from the mold core and its associated surrounding outer shell.

In further accordance with this invention, each of the movable "breaking" mold cavity portions are carried by a rod slideably mounted in a sleeve which is in turn secured to the mold base, and each rod is in turn reciprocated through a cam which is in turn coupled to a rod operated through a linkage by a hydraulic pump or an equivalent mechanism.

With the above and other objects in view that will hereinafter appear, the nature of the invention will be more clearly understood by reference to the following detailed description, the appended claims and the several views illustrated in the accompanying drawings.

IN THE DRAWINGS

Figure 1:
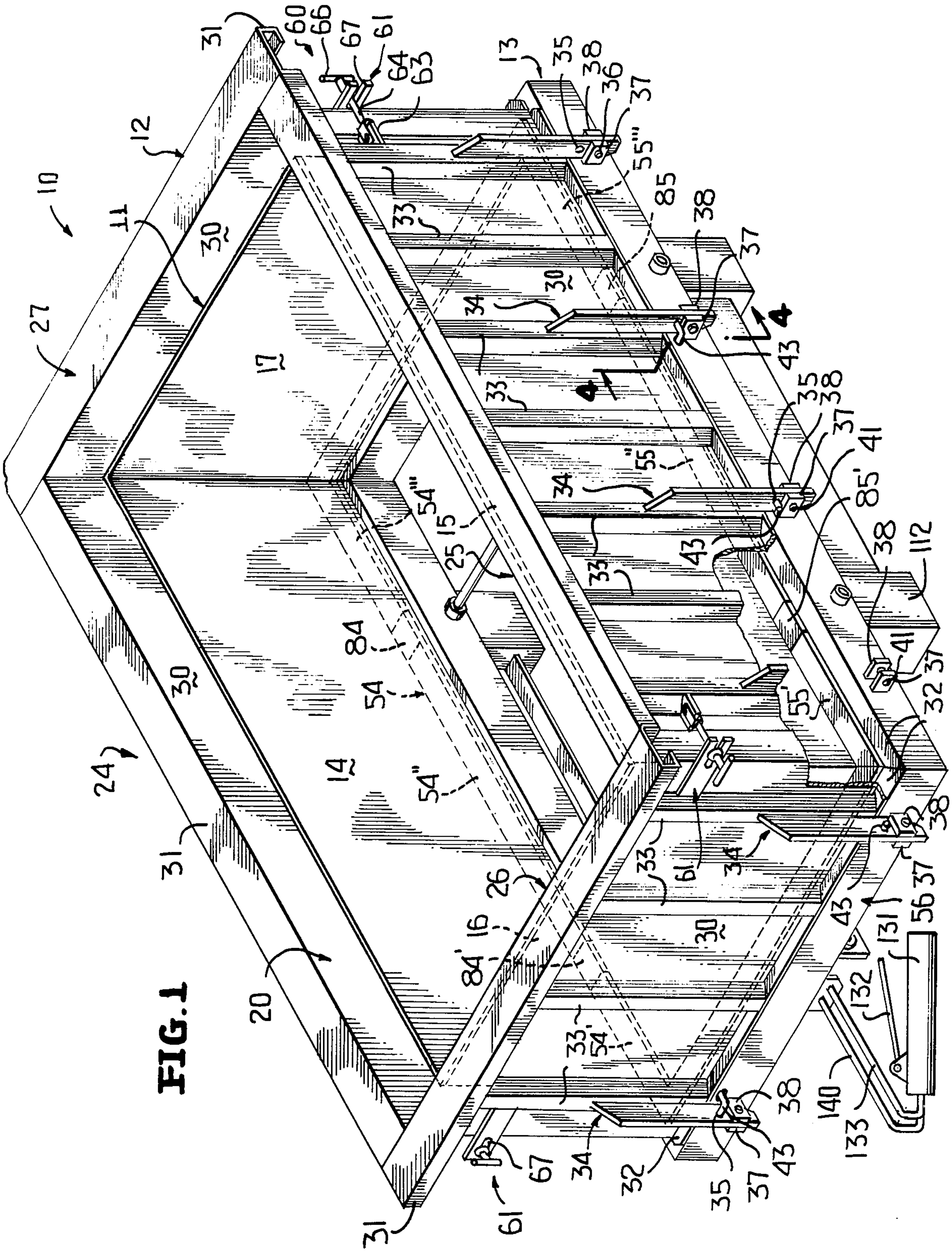
FIG. 1 is a perspective view of a novel mold of this invention with parts broken away for clarity, and illustrates a mold cavity formed by a mold core, a surrounding mold outer shell and a mold base, the latter of which includes a plurality of movable mold portions for breaking or freeing a molded or precast article from the mold cavity.

Reference is first made to FIG. 1 of the drawings in which a mold is illustrated, and is generally designated by the reference numeral 10. The mold 10 includes essentially three major components, namely, an internal mold core 11, an exterior surrounding mold outer shell 12, and a mold base 13, all of which components are preferably constructed from metallic material.

The mold core 11 of the mold 10 includes a pair of side walls 14, 15 disposed in upstanding generally parallel relationship to each other and a pair of opposite end walls 16, 17, likewise disposed in generally upstanding parallel relationship to each other. The walls 14 through 17 are preferably welded or otherwise secured to each other and, thus, define a generally rectangular or polygonal configuration, particularly when viewed from top plan. The walls 14 through 17 define an interior surface (not shown) of an article or a precast concrete casting cast within the mold 10, as will be more apparent hereinafter. The walls 14 through 17 have respective lowermost edges or edge portions (unnumbered) which rest upon and are supported by the base 13, as is clearly illustrated in FIG. 1 and will be described more fully hereinafter.

The outer shell 12 of the mold 10 likewise includes a pair of upstanding generally parallel side walls 24, 25 and similar upstanding generally parallel disposed end walls 26, 27. The walls 24 through 27 are in spaced parallel relationship to the respective walls 14 through 17 and define therewith and in conjunction with the base 13 a general rectangular mold cavity designated by the reference numeral 20. Concrete or like pourable material is poured into the mold cavity 20 and upon the solidification thereof, a molded or precast concrete or similar article is formed and must of course, be removed from the mold cavity 20 without damaging the molded article or the mold 10.

The release of the molded article from within the mold cavity 20 is augmented by pivotally connecting each of the walls 24 through 27 to the base 13, such that these walls can move from their vertical position (FIG. 1) to a position disposed generally at a 45 degree angle to a horizontal plane through the base 13.

Figure 4:
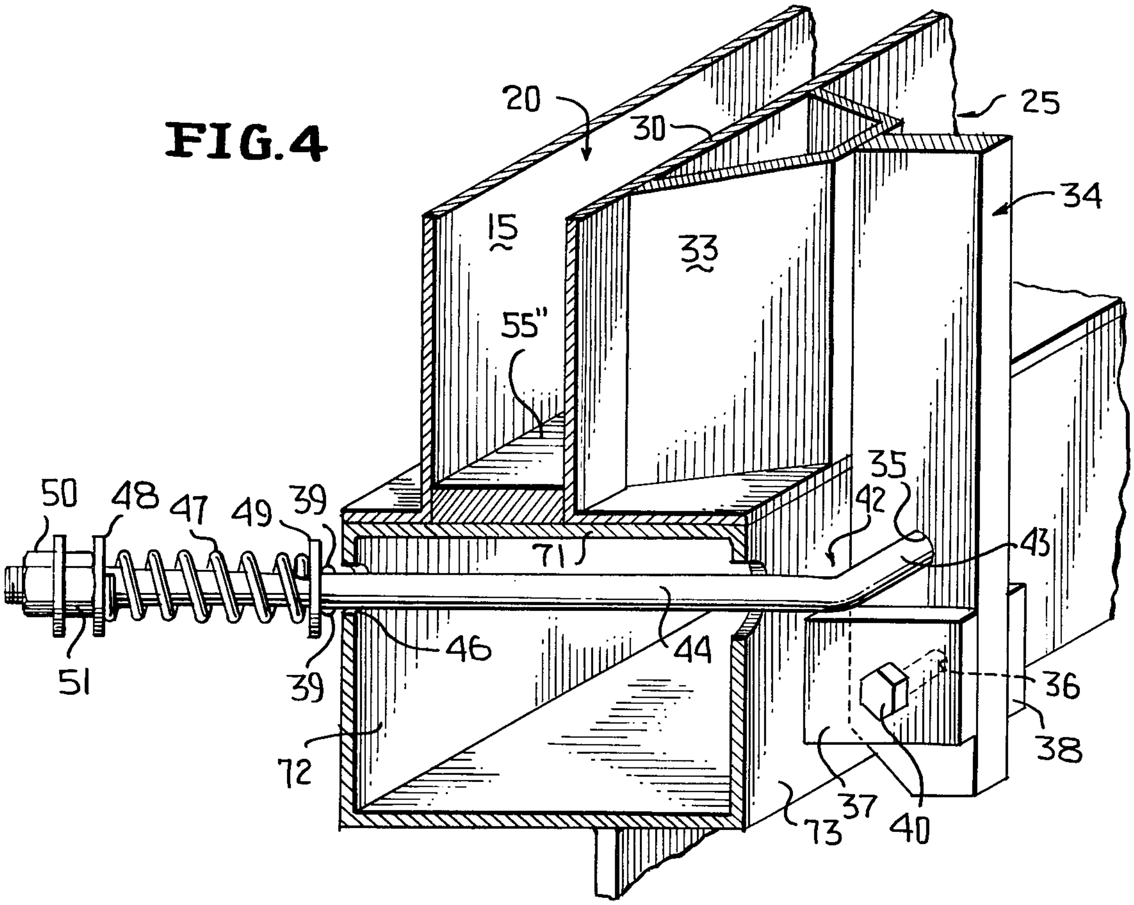
FIG. 4 is a sectional view taken generally along line 4—4 of FIG. 1, and illustrates the manner in which a side wall defining the mold outer shell is pivotally secured to a side rail of the base and carries a spring for limiting the opening pivotal motion of the mold side.

The side walls 24, through 27 are generally identical and each includes a wall 30, an upper outwardly directed and inwardly rebent flange 31 and a lower outwardly directed flange 32. A plurality of vertical reinforcing members 33 are disposed in parallel spaced relationship to each other and are welded or otherwise secured to the wall 30 and to the flanges 31, 32, such that the wall 24 through 27 are rigidified. A plurality of brackets 34 having apertures 35, 36 are welded to selected ones of the vertical reinforcing members 33, and each bracket 34 is disposed in sandwich relationship between brackets 7, 8 (FIG. 4) welded to the base 13. A bolt 40 passes through apertures 41 (FIG. 4) of the brackets 37, 38 and the apertures 36 of each of the brackets 34 to pivotally secure each bracket 34 to the base 13, and thus, permit each wall 24 through 27 to pivot between a vertical position and a position generally at 45 degrees to the horizontal.

Figure 2:
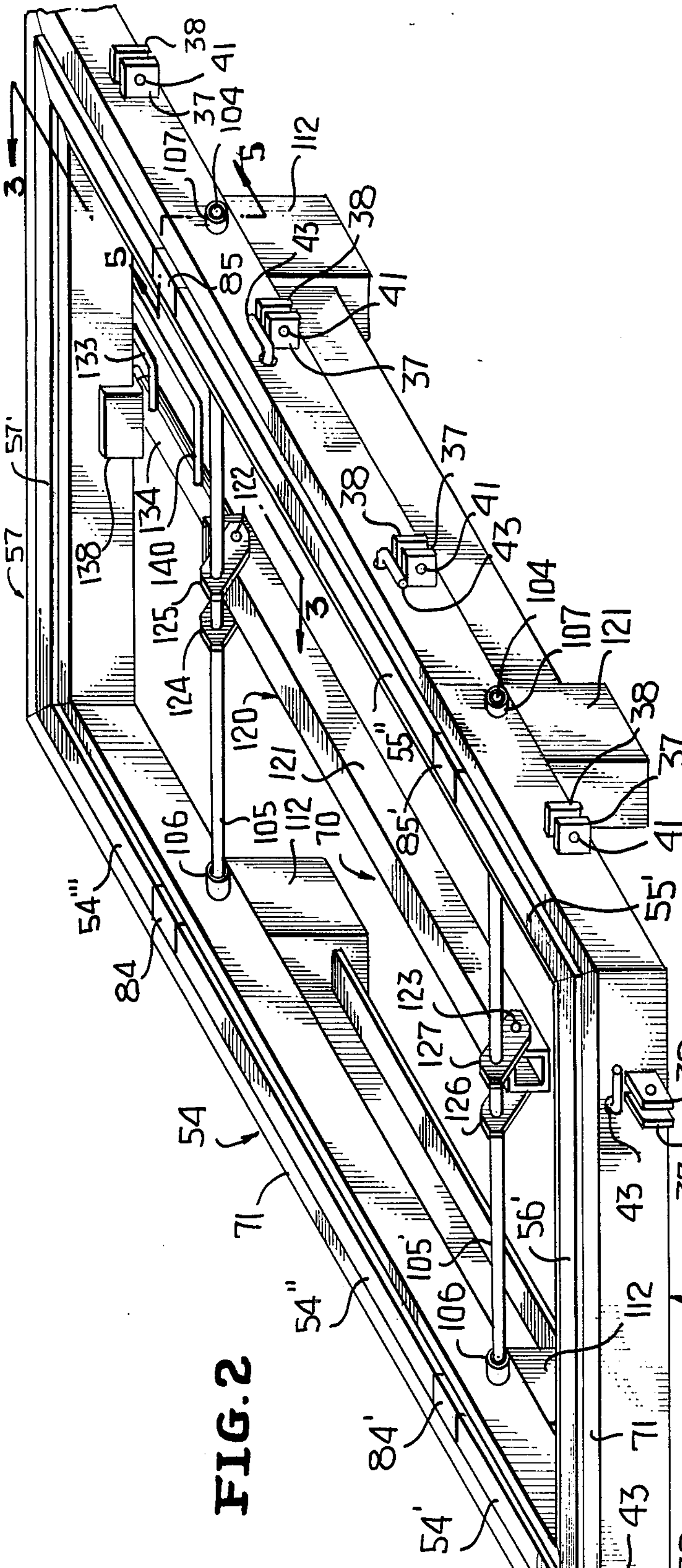
FIG. 2 is a perspective view of the mold base and illustrates the general rectangular peripheral configuration thereof defined by parallel side and end rails with the side rails each having a pair of movable mold portions defining the means for breaking the molded article from the mold cavity, and a linkage mechanism for operating the movable mold portions in unison.

In order to limit the pivoting movement of each of the walls 24 through 27 toward their open position and in effect counterbalance the weight of each of these walls, a generally L-shaped rod 42 (FIG. 4) is positioned such that an arm 43 thereof is seated within an associated one of the apertures 35 of the bracket 34, and a leg 44 of each rod 42 passes through respective openings 45, 46 (FIG. 4) of respective side rails 54, 55 and end rails 56, 57 in part defining the overall rectangular configuration of the base 13, as is best illustrated in FIG. 2. A compression spring 47 is sandwiched between a pair of washers 48, 49, the latter of which is limited in its movement to the right by welds or upsets 39 on the leg 44 and the remaining washer 48 is movable by a pair of nuts 50, 51 threaded upon a threaded end portion 52 of the leg 44 of the associated rod 42. The nuts 50, 51 can be threaded in one direction or the other relative to the threaded end portion 52 of each of the rods 42 to increase or decrease the force of the spring 47. Thus, as any one of the walls 24 through 27 is pivoted from its vertical position to generally a position at 45 degrees to the horizontal, the washer 49 associated with each rod 42 will be drawn toward and against the associated base rail 54 through 57 resulting in limited movement of the washer 49 toward the washer 48 and the nuts 50, 51 and, of course, the compression of the spring 47 thereby resulting in each of the walls 24 through 27 being supported resiliently through the spring 47 and the associated rods 42 in their opening position (45 degrees to the horizontal).

The side walls 24, 25 also carry at each of their uppermost opposite exterior corners a locking mechanism generally designated by the reference numeral 60 which is cooperative with a locking mechanism 61 similarly carried at the exterior upper corner of each of the end walls 26, 27. Each locking mechanism 60 at each of the upper corners at each of the side walls 24, 25 includes a generally bifurcated member 62 pivotally connected by a vertical pivot pin (not shown) to a horizontally disposed plate 63 welded to each of the end most ones of the vertical reinforcing members 33. The bifurcated member 62 has a threaded bore (unnumbered) into which is threaded a threaded end portion (unnumbered) of a threaded rod 64 carrying a washer 65 affixed thereto and terminating in a handle 66. The rod 64 is adapted to be disposed within a horizontally disposed endwise opening slot 67 of the locking mechanism or bracket 61 carried by each of the end walls 26,27. The portion of the rod 64 which is received in the slot 67 is that unnumbered portion between the handle 66 and the washer 65. When thus positioned, the handle 66 is merely rotated to bring the washer 65 into bearing engagement with the outer face (unnumbered) of the bracket or locking mechanism 61 thereby locking each side wall 24, 25 at its corner to the adjacent corner of the associated end walls 26, 27.

Figure 3:
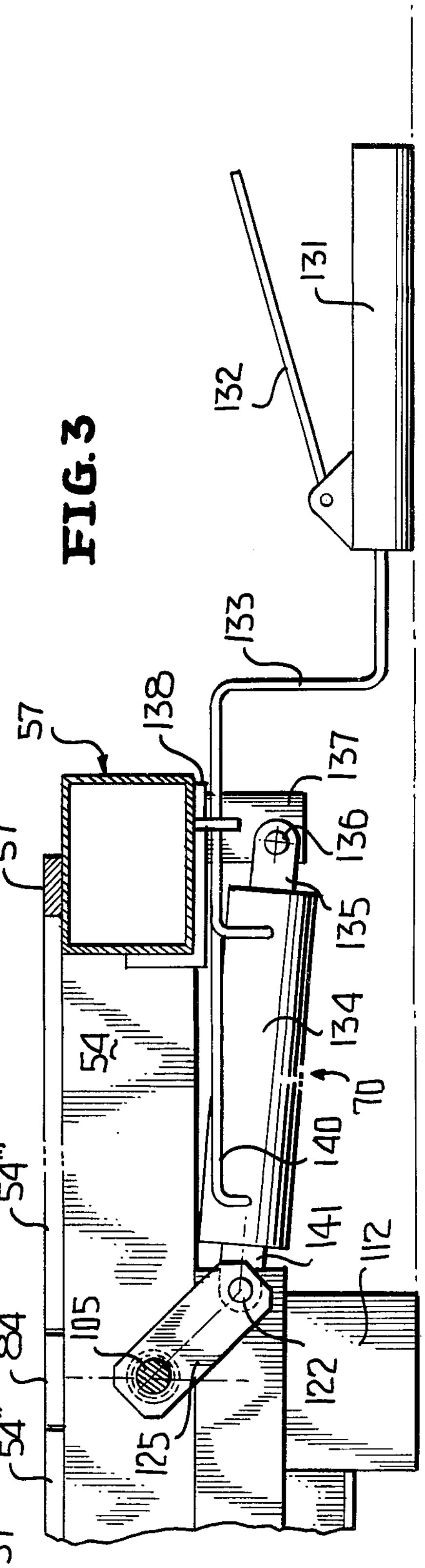
FIG. 3 is a sectional view taken generally along line 3—3 of FIG. 2, and illustrates details of a hydraulic motor connected to the linkage mechanism and operated through a pump for moving the linkage and, thus, the mold cavity portions for breaking a molded article from the associated mold cavity.
Figure 5:
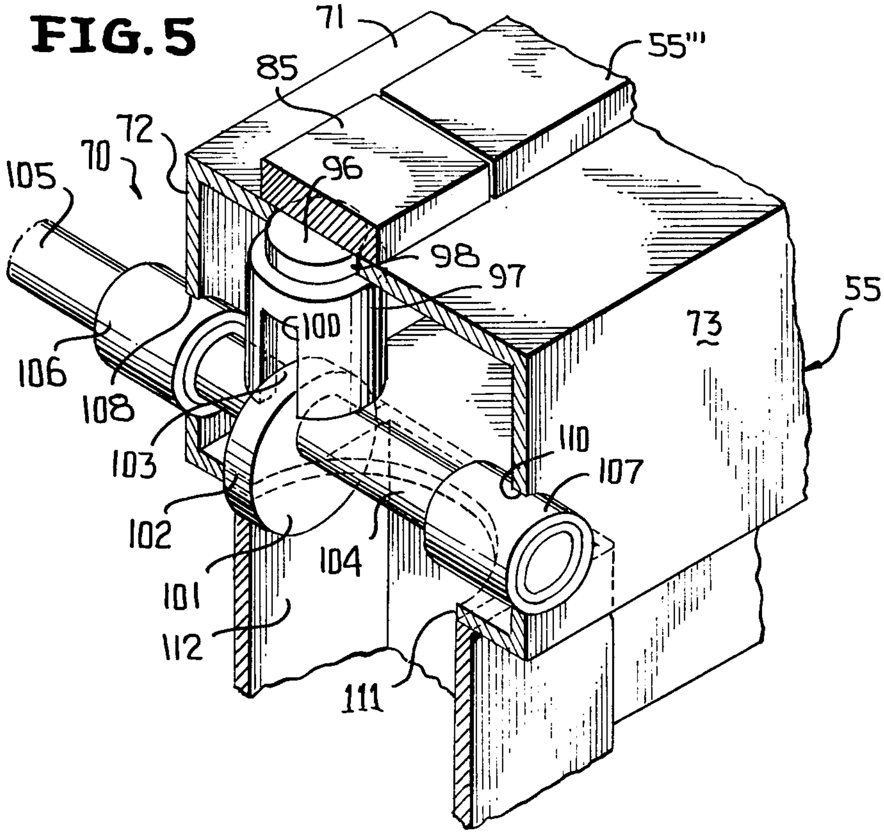
FIG. 5 is a fragmentary perspective view taken generally along line 5—5 of FIG. 2, and illustrates one of the movable mold portions for "breaking" a molded article from the mold cavity, and illustrates a rod carrying the mold portion reciprocal in the sleeve with the rod being reciprocated by a cam carried by a shaft which is in turn coupled to the linkage mechanism best shown in FIG. 2.

Reference is now made particularly to FIGS. 2, 3 and 5 of the drawings which collectively disclose a mechanism, generally designated by the reference numeral 70 associated with the mold base 13 of the mold 10 for removing a precast concrete casting or like molded article from within the mold cavity 20.

The overall releasing mechanism 70 is, of course, carried by the base 13 which, as was noted earlier, is defined by the four side rails 54 through 57, each of which is of a box-like cross section (FIG. 4) defined by an upper plate 71, side plates 72, 73, and a bottom plate 74. A raised rib 56′ is welded atop the plate 71 of the side rail 56 and a like raised rib 57′ is welded or otherwise secured atop the plate 71 of the side rail 57. Similarly, the side rails 54 and 55 have respective raised ribs 54′, 54″, 54‴, and 55′, 55″ and 55‴, respectively. The raised ribs 54′, 54″ are spaced from each other, as are the raised ribs 54″ and 54‴. Similarly, the raised ribs 55′ and 55‴ are spaced from the raised rib 55″. Within the latter-noted spacings are means in the form of plates 84, 84′, 85, and 85′ (FIG. 2), which form continuations of the respective rails 54′ through 54‴ and 55′ through 55‴. However, whereas the plates or rails 54′ through 54‴ and 55′ through 55‴ are secured by welding or otherwise to the respective side rails 54, 55, the plates 84, 84′ and 85, 85′ are movable simultaneously with respect to the respective rails 54, 55 by a mechanism forming part of the overall releasing mechanism 70 which is best shown in FIG. 5 and is generally designated by the reference numeral 95.

The mechanism 95 is associated with the plate 85, and it is to be understood that the following description of the mechanism 95 applies to like mechanisms associated with the plates 84, 84′ and 85′.

The plate 85 of the mechanism 95 is welded or otherwise secured to a vertically disposed cylindrical rod 96 (FIG. 5) which in turn is mounted for vertical reciprocal sliding motion in a sleeve 97 which is in turn received in an aperture 98 of the upper plate or web 71 of the side rail 55. The sleeve 97 is welded to the plate 71 and thereby forms a bearing or guide for the reciprocation of the rod 96 and the plate 85 carried thereby. The sleeve 97 includes diametrically opposite slots of which only a slot 100 is illustrated, and the slot 100 and the unillustrated slot opposite thereto receives a rotatable cam 101 having a cam surface 102 which engages against a bottom end 103 of the rod 96. The cam 101 is carried by an end portion 104 of a shaft 105 which is identical to another shaft 105′ (FIG. 2) bridging the area between the side rails 54, 55 (FIG. 2). The end portion 104 of the shafts 105 and 105′ are suitably journalled in the webs 72, 73 of the associated side rails 54, 55. As is best illustrated in FIG. 5, the end portion 104 of the shaft 105 is journalled for rotation in a pair of sleeves 106,107 which are received in apertures 108, 110, respectively, of the webs 72, 73, respectively, of the side rail 55. The sleeves 106, 107 are, of course, welded or otherwise secured to the respective webs 72, 73. An access opening 111 is provided in the web 74 and the access opening 111 is surrounded by a generally rectangular hollow leg 112 which is welded or otherwise secured to the web 74 of the side rail 55. Identical legs bearing similar but primed reference numerals are associated with the remaining plates 84, 84′ and 85′, as is best indicated in FIG. 2. If the shaft 105 is rotated clockwise, as viewed in FIG. 5, the cam 101 carried thereby will be rotated in a similar direction, and the surface 102 bearing against the end 103 of the rod 96 will raise the latter upwardly which in turn will raise the plate 85. The plate 85 and, of course, the plates 84, 84′ and 85′ form or define a bottom wall of the mold cavity 20 along with the plates or rails 54′ through 54‴ and 55′ through 55‴. Thus, as the plate 85 is raised and the plates 84, 84′ and 85′ are raised simultaneously therewith, the article within the mold cavity 20 which has cured is "broken" away from the upper surfaces of the rails or plates 54′ through 54‴ and 55′ through 55‴, as well as away from the rails 56′ and 57′; thus freeing the molded or cast article and permitting the eventual removal thereof from the mold cavity 20.

Each of the mechanisms 95 of the release mechanism 70 are simultaneously operated by the rotation of the shafts 105, 105′ through a linkage mechanism, generally designated by numeral 120. The linkage mechanism 120 includes a generally tubular rod 121 (FIG. 2) of a rectangular cross section carrying a pair of pivot pins 122, 123 to each of which is pivoted respective links 124, 125 and 126, 127. The links 124, 125 are welded or otherwise fixed to the shaft 105, and the links 126, 127 are welded or otherwise fixed to the shaft 105'. If the rod 121 of the linkage mechanism 120 is moved from the position shown in FIG. 2 to the left in this same figure, the links 124 through 127 will turn clockwise about the axes of the shafts 105, 105', thus rotating these same shafts clockwise, resulting in the rotation of the cams 101 in the manner heretofore described to simultaneously raise the plates 84, 84', 85 and 85' to effect the "breaking" of the precast concrete casting or similar molded article from the mold cavity 20. Obviously, the rod or tube 121 is shifted back to the original position shown in FIG. 2 to again lower the plates 84, 84', 85 and 85' so that other articles can be molded within the mold cavity 20, and the process repeated ad infinitum as circumstances dictate.

The mechanism for reciprocating the rod 121 of the linkage 120 includes fluid motor means generally designated by the reference numeral 130 (FIG. 3). The fluid motor means 130 includes a conventional hydraulic pump 131 having a handle 132 which can be "pumped" in a continuous repetitive fashion to compress hydraulic fluid conveyed to the pump or cylinder 131 from a suitable source or from a self-contained reservoir to pressurize via a conduit or line 133 the rod end of a fluid cylinder 134 which carries a bracket 135 at one end which is in turn connected by a pivot pin 136 to a vertical bracket 137 welded to an angle iron 138 which is in turn welded or otherwise fixed to the end rail 57 (FIGS. 2 and 3). As the pressurized medium is introduced into the rod end of the cylinder 134, fluid from the head end is exhausted from the cylinder 134 through a line or conduit 140 and returned to the cylinder 131 or to a suitable reservoir. The same pressurization extends in a progressive manner a rod 141 which is connected to the pivot pin 122. Thus, as the rod 141 moves to the left, as viewed in FIG. 3, the bracket 125 is rotated clockwise, likewise rotating the shaft 105 in the same direction and operating the plate 84 associated therewith along with the remaining plates 84, 84' and 85'.

Although only a preferred embodiment of the invention has been specifically illustrated and described herein, it is to be understood that minor variations may be made in the apparatus or in the method of without without departing from the spirit and scope of the invention, as defined in the appended claims.

I claim:

1. A mechanism for releasing a molded article from a mold cavity comprising first, second, third and fourth means for defining respective first, second, third and fourth spaced portions of a mold cavity within which an article is adapted to be molded, first, second, third and fourth rods secured to said respective first, second, third and fourth mold cavity portions, first, second, third and fourth cam means for imparting motion to said respective first, second, third and fourth rods which in turn move said respective first, second, third and fourth mold cavity portions whereby a molded article is moved and thus released from an associated mold cavity, means for simultaneously rotating said first, second, third and fourth cam means to impart simultaneous motion to said first, second, third and fourth rods and the first, second, third and fourth mold cavity portions carried thereby to impart generally equal release forces to an associated molded article, said simultaneous rotating means including first and second shafts connected to and between said first and second cam means and said third and fourth cam means respectively, and linkage means connected between said first and second shafts for translating rocking motion imparted to said linkage means to simultaneous rotation of said first and second shafts and the respective first and second cam means and said third and fourth cam means.

2. The mechanism as defined in claim 1 including fixed first, second, third and fourth guide sleeves having respective first, second, third and fourth bores receiving said respective first, second, third and fourth rods for guiding said first, second, third and fourth rods during the movement thereof.

3. The mechanism as defined in claim 1 wherein said first and second shafts each has an axis disposed generally normal to the direction of motion of said first and second and third and fourth rods, respectively.

4. The mechanism as defined in claim 1 wherein said linkage means includes first and second links connected to said respective first and second shafts, and a fifth rod connected between said first and second links.

5. The mechanism as defined in claim 4 including mens for imparting generally linear reciprocal motion to said fifth rod.

6. The mechanism as defined in claim 4 including hydraulic means for imparting generally linear reciprocal motion to said fifth rod.

7. The mechanism as defined in claim 4 wherein pivots are provided for pivotally connecting said first and second links to said fifth rod.

8. The mechanism as defined in claim 7 including hydraulic means for imparting generally linear reciprocal motion to said fifth rod.

9. The mechanism as defined in claim 1 wherein said first through fourth mold cavity portions in part define a bottom peripheral wall of said mold cavity, and bottom peripheral wall is immediately inboard of an upstanding outermost cavity-defining peripheral wall.

10. The mechanism as defined in claim 9 wherein said bottom peripheral wall is immediately outboard of an upstanding innermost cavity-defining peripheral wall.

11. The mechanism as defined in claim 4 wherein said fifth rod is disposed generally normal to said first and second shafts.

12. The mechanism as defined in claim 11 wherein said fifth rod is disposed between said first and third mold cavity portions and said second and fourth mold cavity portions, respectively.

* * * * *